July 18, 1967

H. E. BEASLEY 3,331,549

EASY OPEN CONTAINER

Filed Jan. 19, 1966

INVENTOR:
HAROLD E. BEASLEY
BY Gravely, Lieder & Woodruff
ATTORNEYS.

United States Patent Office 3,331,549
Patented July 18, 1967

3,331,549
EASY OPEN CONTAINER
Harold E. Beasley, Crestwood, Mo., assignor to Container Corporation of America, Chicago, Ill., a corporation of Delaware
Filed Jan. 19, 1966, Ser. No. 521,705
7 Claims. (Cl. 229—51)

ABSTRACT OF THE DISCLOSURE

An easy openable paper or fiberboard container provided with a principal wall having a liner on the inside to enclose the contents and an outer label to carry the advertising material and to seal the main wall and the contents against the ingress of moisture and contaminates, the whole assembly being provided with a spiral pull means that will effectively break through the label and the main wall so as to directly expose the liner which when so exposed is easily fractured to complete the opening operation.

---

This invention relates to containers for refrigerated biscuit dough and is particularly concerned with a construction which is inexpensive to manufacture and easily opened without reducing the strength necessary to retain the contents.

A problem with past biscuit dough containers has been the difficulty encountered by the housewife in opening the container. It is recognized that the container must have wall strength to resist the pressure of the dough therein and avoid the danger of bursting inadvertently or during the opening process. A considerable pressure is built up in biscuit containers due to the self-rising nature of the dough and the proofing period which the packed containers are subjected to. It has heretofore been the practice to make biscuit containers with an excess of wall strength and to provide opening means to break open a wall ply without directly exposing the contents or the liner ply which encloses the dough contents so that a second opening step is required. This makes for an excessively expensive construction which is exceedingly difficult to open and often results in mis-shaping the dough wafers.

One object of the present invention is to provide an easy to open container having a construction which allows breaking through the wall directly to the liner.

Another object of the present invention is to provide an inexpensive container with a novel combination of wall plies and opening means which substantially reduces the difficulty of opening the same.

Other objects and advantages of the present invention will be set forth in the following description of a preferred container embodiment which includes a liner, a main wall ply, an outer label ply, provision for opening the container by breaking through the label and main wall plies directly to the liner ply, and the application of adhesive which maintains the integrity of the liner ply until a simple force is applied to fracture the liner ply which effects complete opening of the container quickly and with minimum adverse effect upon the contents.

This invention also comprises the parts and components which will be set forth hereinafter, reference being directed to the accompanying drawings, wherein.

Figure 1:
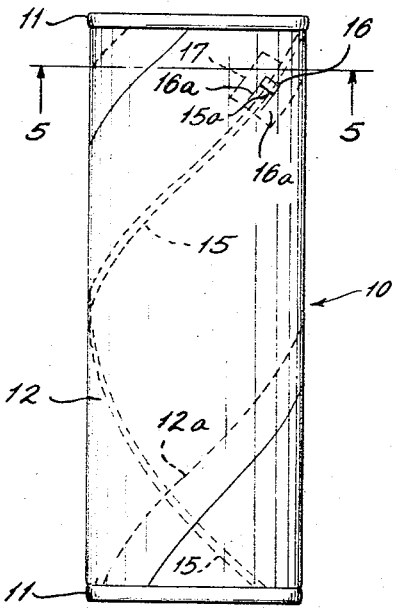
FIG. 1 is a side view of the preferred embodiment of the container.
Figure 5:
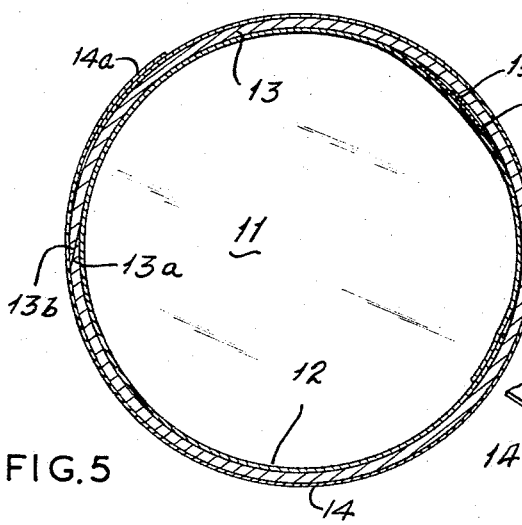
FIG. 5 is a cross-section on an enlarged scale of the container seen at line 5—5 in FIG. 1.

Referring to FIGS. 1 and 5 the preferred container comprises a spirally wound body 10 of tubular form having conventionally seamed on end closures 11 to seal in the biscuit dough. The body 10 includes an inner liner ply 12, a main wall ply 13, and an outer label ply 14. The easy opening provision includes a tear tape or equivalent means 15 positioned between the liner and wall plies and passing spirally about the body 10 for at least one turn where its ends are secured by the seamed on end closure 11. As seen in FIG. 1 the starting end 15a of the tear means 15 is distinguished by the formation of a perforation 16 through the label 14, the main wall ply 13 and the means 15. The perforation 16 results in a local area of weakness which is reinforced by a structural patch 17 which is disposed between the wall ply 13 and the liner ply 12. In forming the starting end 15a the opposite sides of the perforation 16 are extended at cuts 16a whereby the end 15a may be lifted to form a portion for grasping to pull the means 15 which tears through the main wall ply 13 and label ply 14, as may be seen in FIG. 2.

Figure 3:
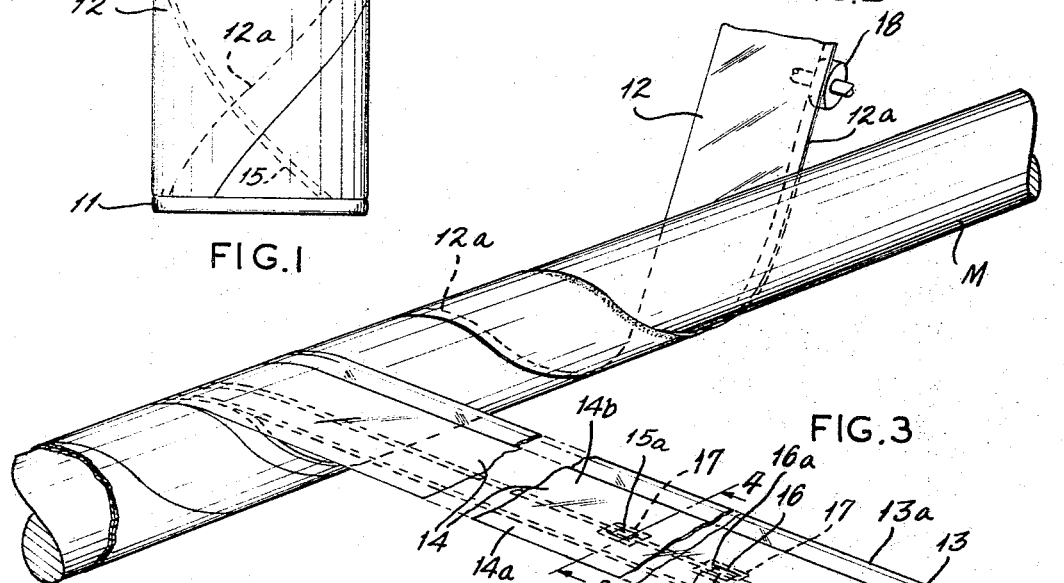
FIG. 3 is a schematic diagram of the method for forming the container.
Figure 4:
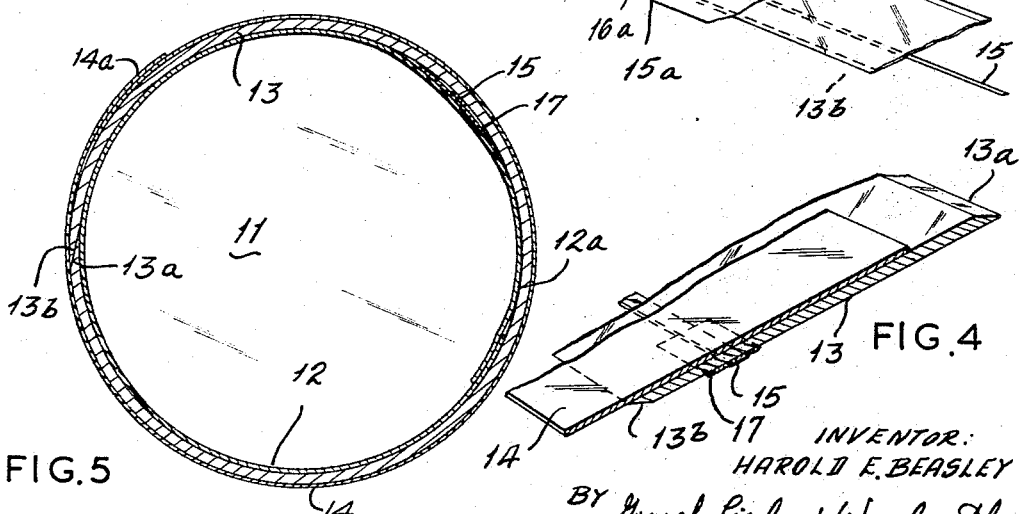
FIG. 4 is a cross-section on an enlarged scale of the main wall ply seen at line 4—4 in FIG. 3.

Turning now to FIGS. 3 and 4 it can be seen that the various plies and components are brought together in a spiral winding machine which is represented by the mandrel M, the usual pulley and winding belt means having been omitted as these parts are understood by those skilled in this art of spiral winding. The liner ply 12 is preferrably a paper-backed .00035 inch metallic foil with a vinyl coating on the foil surface. The vinyl coating acts as the usual slip medium which is presented to the mandrel to make it easier to rapidly slide the liner about the stationary mandrel M. The liner ply 12 is fed onto the mandrel from the under side at such an angle of approach that there is an overlap formed at edge 12a which is secured by the application of a line of adhesive applied by a suitable roller applicator 18.

Having established the liner ply 12 on mandrel M, the other plies are pre-assembled in suitable apparatus prior to being fed onto the mandrel. In the preferred pre-assembly the main wall ply 13 is taken from a supply reel (not necessary to show) and run through an edge bevelling or skiving device in which one edge is formed with a skive 13a on its upper side and the opposite edge is formed with a skive, 13b on its underside. Following the skiving operation, the ply 13 is run over an adhesive applicator roller which applies a full width layer of adhesive, including the bevel 13b. The adhesive coating is used to pick up the tear means 15 which is preferably a tape of approximately one-eighth inch width. The wall ply 13 and tape 15 are then joined by the outer label ply 14 which has its under surface adhesively coated to cause it to adhere to the outer surface of the wall ply 13. The thus pre-assembled plies 13 and 14 with the tear tape 15 are passed to a chopper device of the character shown in the patent of Freese No. 3,164,070, where the starting end 15a is formed as one edge of the perforation 16. The chopper device cuts through the label ply 14, the wall ply 13 and the tape 15, and simultaneously forms the tear directing cuts 16a. Following the action of the chopper device, the perforation 16 is sealed and reinforced by the application of a patch 17 which is of paper-backed foil material positioned with the foil side adhered to the adhesive layer on the wall ply 13.

In feeding the now pre-assembled plies 13 and 14 onto the liner ply 12 which is wound on the mandrel M it is noted that the bevelled edges 13a and 13b are brought into adhesively joined relation to form a flat joint which is located out of registry with the lap edge 12a in the liner ply 12. As the wall ply 13 is wound into place, the label ply 14 seals the wall ply by having its adhesively coated edge 14a lapped over the opposite edge 14b. It is a preference in winding the pre-assembled plies to select an alignment that avoids having the tear tape 15 fall into registry with the lapped edge 12a of the liner ply 12, whereby the maximum strength is achieved and the lapped edge 12a is therefore not exposed upon pulling the tear tape 15 to expose the liner ply 12.

Figure 2:
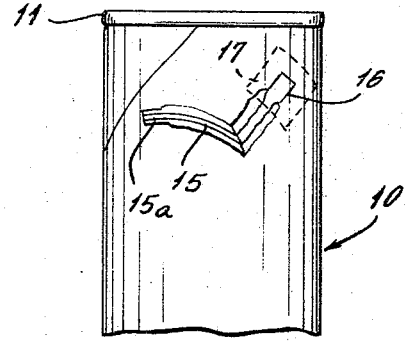
FIG. 2 is a fragmentary side view of the container of FIG. 1 with the opening thereof partially started.

A preferred container construction embodies the above described liner ply 12, and cooperating therewith the patch 17 may be formed of a 60 pound kraft paper bonded to a metallic foil of .00035 inch thickness. The main wall ply 13 may be of 70 pound kraft paper having bevelled edges, and the label ply 14 may be of paper-backed foil forming a moisture barrier on the outside of the container. These plies are wound to form a continuous tubular stick which is fed from the mandrel M to a suitable cutting apparatus (not shown) where the individual container bodies 10 are separated. The cutting operation is timed to locate the starting end perforation 16 close to one end of the finished container, as is shown in FIGS. 1 and 2. Upon opening, the tear tape 15 forms a spirally directed rupture in the label and main wall plies which extends from end to end. A quick rap of the container will fracture the liner ply 12 and a following twist at the end closures 11 will lay the plies open in a flat manner to expose the contents quickly and without damage thereto.

The foregoing description has set forth a presently preferred container construction and the method for manufacturing the same. Those skilled in this art will appreciate the details of apparatus for carrying out the manufacture and thus no particular detailed disclosure of manufacturing apparatus has been thought necessary to a complete understanding for practicing the invention.

What is claimed is:

1. A container comprising: a spirally wound body including a main wall ply having a bonded seam pitched to extend about the body, a liner ply adhesively bonded to the interior of said main wall ply and having a lap seam which is out of registry with said main wall bonded seam, and a label ply adhesively bonded to the exterior of said main wall ply and having a lap seam which is out of registry with each of said seams in said main wall and liner plies; body opening tear means spirally wound into position between said main wall and liner plies and out of registry with each of said lap seams in said liner, main wall and label plies, said tear means extending from end to end of said body and said body having a perforation therein forming a starting end in said tear means exposed through said label and main wall plies adjacent one body end; and reinforcement means in said body between said liner and main wall plies and positioned under said tear means in the area of the exposed starting end.

2. The container set forth in claim 1 wherein end closures are seamed on the opposite ends of said body and secure the tear means thereat.

3. The container set forth in claim 1 wherein said body perforation includes starting tear guide cuts extending along the direction of said tear means, and said tear means is a tape.

4. The container set forth in claim 1 wherein said liner ply is a paper-backed metallic foil for moisture proofing the interior surfaces of said main wall ply and includes a vinyl slip coating on the metallic foil side to facilitate spiral winding of the body.

5. The container set forth in claim 1 wherein said label ply is substantially moisture impervious to moisture proof the exterior surfaces of said main wall ply, and said reinforcement means is a paper-backed metallic foil for moisture proofing the area under said body perforation.

6. The container set forth in claim 1 wherein said liner and label plies are each substantially moisture impervious to moisture proof said main wall ply on its respective inner and outer surfaces, and said reinforcement means is substantially moisture proof to moisture proof the area under said body perforation.

7. The container set forth in claim 1 wherein said bonded seam in said main wall ply is formed by lapping bevelled edges of the wall ply to form a substantially uniform thickness for the main wall.

References Cited
UNITED STATES PATENTS

| | | |
|---|---|---|
| 3,042,286 | 7/1962 | Pottle. |
| 3,051,370 | 8/1962 | Hanlon. |
| 3,093,293 | 6/1963 | Freeze. |
| 3,102,818 | 9/1963 | Zoeller et al. |
| 3,113,714 | 12/1963 | Stump. |
| 3,280,709 | 10/1966 | Elaw _____ 93—94 |

FOREIGN PATENTS

| | | |
|---|---|---|
| 247,127 | 9/1963 | Australia. |

JOSEPH R. LECLAIR, *Primary Examiner.*

D. T. MOORHEAD, *Assistant Examiner.*